United States Patent
Schaer, III

(10) Patent No.: US 10,543,514 B2
(45) Date of Patent: Jan. 28, 2020

(54) WATERBLASTING SYSTEM WITH AIR-DRIVEN ALTERNATOR

(71) Applicant: Federal Signal Corporation, Oak Brook, IL (US)

(72) Inventor: John Bolling Schaer, III, Chappell Hill, TX (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 15/336,163

(22) Filed: Oct. 27, 2016

(65) Prior Publication Data

US 2017/0120303 A1 May 4, 2017

Related U.S. Application Data

(60) Provisional application No. 62/248,718, filed on Oct. 30, 2015.

(51) Int. Cl.
*B08B 3/02* (2006.01)
*B05B 7/24* (2006.01)
*G05B 15/02* (2006.01)
*B05B 12/00* (2018.01)

(52) U.S. Cl.
CPC ............... *B08B 3/02* (2013.01); *B05B 7/24* (2013.01); *B05B 12/00* (2013.01); *G05B 15/02* (2013.01)

(58) Field of Classification Search
CPC . B08B 3/02; B05B 7/24; B05B 12/00; H04W 4/008; G05B 15/02
USPC ............ 169/14, 15, 43, 44, 26, 46, 47; 239/398–434.5
See application file for complete search history.

(56) References Cited

U.S. PATENT DOCUMENTS

| | | | |
|---|---|---|---|
| 3,464,321 A * | 9/1969 | Piotrowski, Jr. | ........ F15B 11/08 137/102 |
| 4,408,419 A | 10/1983 | Appling | |
| 5,268,019 A | 12/1993 | Rathbone | |
| 5,920,133 A * | 7/1999 | Penswick | ................ F02G 1/043 310/15 |
| 6,973,975 B1 * | 12/2005 | Adamson | ................ A62C 5/02 169/24 |
| 7,735,325 B2 | 6/2010 | Ruggieri et al. | |
| 7,963,463 B2 | 6/2011 | Breedlove et al. | |
| 2005/0268425 A1 | 12/2005 | Clemons, Sr. | |
| 2010/0193201 A1 * | 8/2010 | Zeller | ..................... A62C 5/02 169/46 |
| 2011/0036095 A1 | 2/2011 | Krajicek | |

(Continued)

FOREIGN PATENT DOCUMENTS

WO    WO2005083247    9/2005

OTHER PUBLICATIONS

Commercialized air compressor with an alternator, available from Ingersoll Rand, available before Oct. 27, 2016.

(Continued)

*Primary Examiner* — Alexander M Valvis
*Assistant Examiner* — Qingzhang Zhou
(74) *Attorney, Agent, or Firm* — Merchant & Gould P.C.

(57) ABSTRACT

A waterblasting system includes a fluid supply device, an air supply device, and a waterblasting tool. The air supply device contains a battery and an alternator in a single unit. The alternator is operated by compressed air from a separate air compressor and generates electric power, at least some of which is used to charge the battery.

9 Claims, 9 Drawing Sheets

(56) References Cited

U.S. PATENT DOCUMENTS

| | | | |
|---|---|---|---|
| 2011/0174605 A1* | 7/2011 | Ugolin | B01D 1/16 203/10 |
| 2012/0297759 A1 | 11/2012 | Chiu | |
| 2013/0092745 A1* | 4/2013 | Karp | B08B 3/026 239/1 |
| 2013/0280991 A1 | 10/2013 | Loubeyre | |
| 2014/0109936 A1 | 4/2014 | Gromes, Sr. | |
| 2014/0333525 A1 | 11/2014 | Gromes, Sr. et al. | |
| 2014/0336793 A1 | 11/2014 | Gromes, Sr. et al. | |
| 2014/0336827 A1 | 11/2014 | Gromes, Sr. et al. | |
| 2014/0336828 A1 | 11/2014 | Gromes, Sr. et al. | |
| 2015/0266039 A1* | 9/2015 | Ulrich | B05B 5/0532 239/707 |

OTHER PUBLICATIONS

Genair Air Compressor/Generator Combination Systems, 2017 Vanair Manufacturing, Inc.
Boss PTO Drive Compressor/Generator Multifunction Units, 2017 Boss Industries, LLC.

* cited by examiner

WATERBLASTING SYSTEM WITH AIR-DRIVEN ALTERNATOR

CROSS-REFERENCE TO RELATED APPLICATION

This application claims the benefit of provisional application Ser. No. 62/248,718, filed Oct. 30, 2015, which is incorporated herein by reference in its entirety.

This application relates to the U.S. Provisional Patent Application No. 62/248,694 titled WIRELESS CONTROLLED WATERBLASTING SYSTEM, filed on the same day as the present patent application, the entirety of which is hereby incorporated by reference.

BACKGROUND

In various waterblast industries, waterblasting systems are used to direct a high pressure blast of fluid, such as water, against various surfaces such as concrete, metal, and the inside of tubes and vessels to clean unwanted deposits therefrom or to cut the materials. Such fluid jet stream can have a pressure in the range of 5,000 to 40,000 psi.

Waterblasting systems involve several safety precautions because the systems are designed to spray high velocity streams of compressed air, fluids, and/or abrasive particles on a surface. The environments in which the waterblasting systems operate are typically hostile due to, for example, heavy equipment traffic, standing water, water jets, and other hazardous elements. Several components of waterblasting systems are connected via water hoses, air hoses, and electrical cables, which are exposed to such severe environments. The hazardous environments are typically more detrimental to the operation of electrical cables than to water hoses and air hoses because of their dimensions and electrical nature.

Some of the electrical cables used in the waterblasting systems are configured to supply electric power to air control valve units, controllers, and air compressors. Such power cables typically run between separate components or devices of a waterblasting system and between the waterblasting system and an external power source, such as A/C mains. Since the components or devices of the waterblasting system are made and arranged separately, the electrical cables are exposed to the harsh working conditions of the waterblasting system. Therefore, it is desirable to maintain such electrical cables as short as possible.

SUMMARY

In general terms, this disclosure is directed to a waterblasting system. In one possible configuration and by non-limiting example, the waterblasting system includes an alternator that generates electric power using pneumatic power. Various aspects are described in this disclosure, which include, but are not limited to, the following aspects.

One aspect is a waterblast system including a waterblast tool, a fluid supply device, an air compressor, an air supply device, and an alternator. The fluid supply device is configured to provide a pressurized fluid to the waterblast tool. The air compressor is configured to generate a compressed air. The air supply device is connected to the air compressor via an air hose and configured to receive the compressed air and deliver the compressed air to the waterblast tool. The alternator is contained in the air supply device and configured to generate electric power from the compressed air.

In certain examples, the air supply device includes a valve unit pneumatically connected to the waterblast tool, and an air preparation and power unit. The air preparation and power unit is pneumatically and electrically connected to the valve unit and pneumatically connected to the air compressor. The air preparation and power unit operates to receive the compressed air from the air compressor, manage the compressed air to be suitable for the waterblast tool, and deliver the compressed air to the waterblast tool.

In certain examples, the air preparation and power unit is not electrically connected to the air compressor. The air preparation and power unit includes a filter, regulator, and lubricator unit configured to filter, regulate, and lubricate the compressed air upstream of the valve unit, and a power source configured to provide electric power to the valve unit. The alternator is contained within the air preparation and power unit and converts mechanical energy of the compressed air to electric power.

Another aspect is an air preparation and power unit for a waterblast system. The unit includes an air inlet port, an air outlet port, a filter, regulator, and lubricator unit, a power source, and an alternator. The air inlet port is provided to receive a compressed air from an air compressor. The air out port is provided to output at least part of the compressed air to a valve unit that is pneumatically connected to a waterblast tool. The filter, regulator, and lubricator unit is arranged between the air inlet port and the air outlet port and configured to filter, regulate, and lubricate the compressed air upstream of the valve unit. The power source is configured to provide electric power to the valve unit. The alternator operates to receive at least part of the compressed air and generate electric power therefrom. At least a portion of the electric power from the alternator is supplied to the power source for charging.

The above features and advantages and other features and advantages of the present teachings are readily apparent from the following detailed description for carrying out the present teachings when taken in connection with the accompanying drawings.

DETAILED DESCRIPTION

Figure 1:
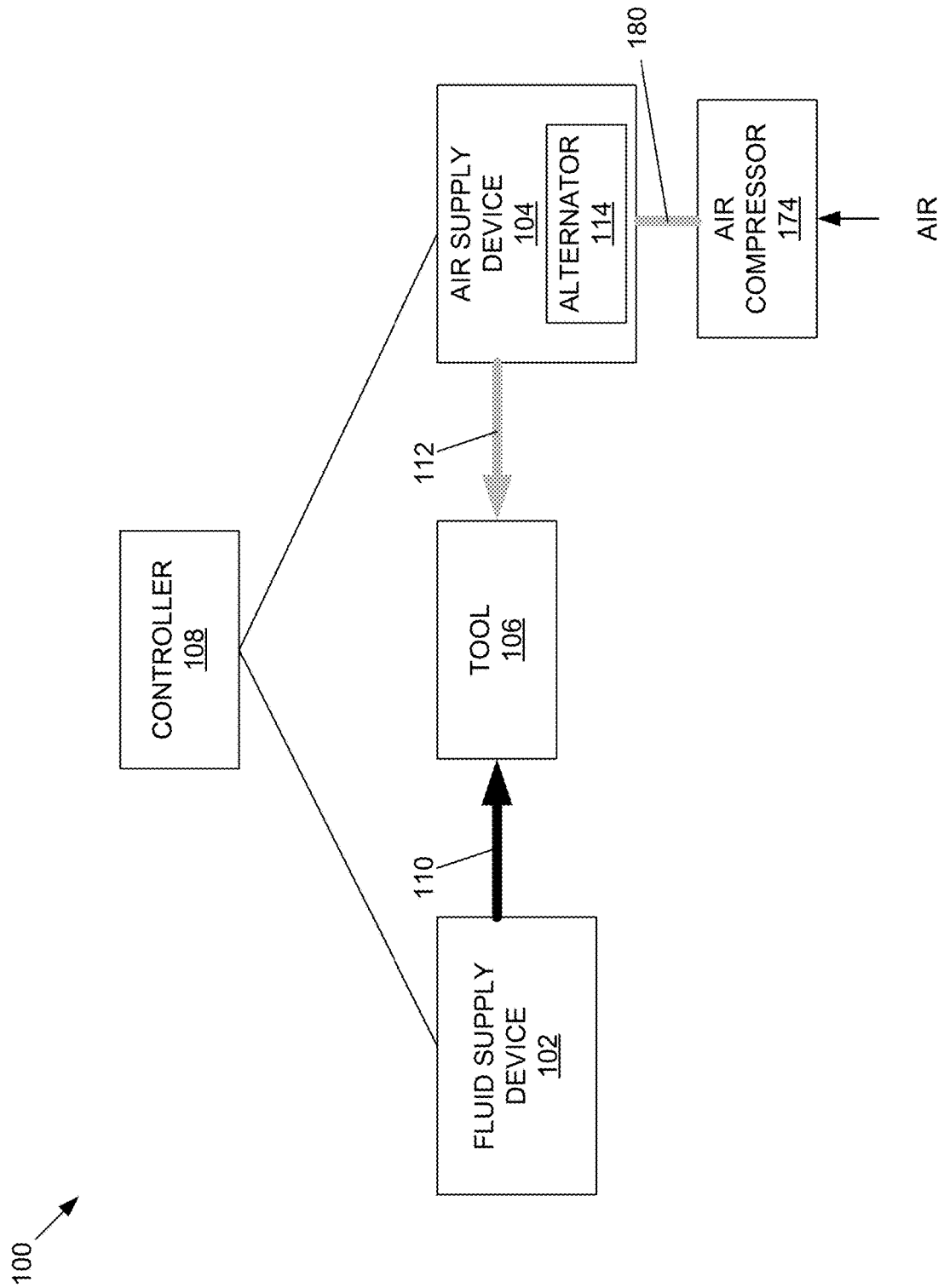
FIG. 1 schematically illustrates a waterblast system in accordance with an example embodiment of the present disclosure.

Various embodiments will be described in detail with reference to the drawings, wherein like reference numerals represent like parts and assemblies throughout the several views.

In general, the waterblasting system in accordance with the present disclosure includes a fluid supply device, an air supply device, and a waterblast tool. The fluid supply device can be arranged separately from the air supply device. The air supply device of the waterblasting system can include a valve unit and an air preparation and power unit. The air preparation and power unit includes a power source that supplies electric power to components of the valve unit and/or the air preparation and power unit. The air preparation and power unit further includes an alternator that is driven by compressed air delivered from an air compressor via an air hose. The alternator can be used as either a device for charging the power source or the power source itself, or both. For example, the electric power generated by the alternator is used to charge the power source (e.g., a battery) and/or to supply electric power to the components of the air supply device. Where the power source includes a battery, as the alternator can recharges the battery when the system is in operation, the battery need not maintenance or replacement as frequent. Therefore, the alternator can reduce maintenance work by extending the life of the power source. For example, the alternator can extend the intervals for replacing the power source. Further, the power source including either the alternator or the battery and the alternator of the present disclosure can replace an external power source, such as A/C mains, for operating components of the air supply device, thereby eliminating electric cables that extend from the air supply device to connect the external power source.

Some commercially-available air compressors incorporate an air-driven alternator as a unit. The alternator contained in such air compressors can be configured for internal combustion engines and is used to charge a vehicle battery that is used for starting the engine. In theory, such air compressors can be modified and used to charge the battery contained in the air preparation and power unit of the waterblasting system, and to supply electric power to the air supply device. However, electrical cables are needed to electrically connect the alternator of the air compressor to the air supply device. Therefore, the electric cables are exposed to the harsh working environments of the waterblasting system.

According to the present disclosure, the air preparation and power unit contains the alternator for supplying electric power to components of the air supply unit. In certain examples, the air preparation and power unit contains both the battery and the alternator in a single unit. As the alternator is electrically connected to the battery within the unit, electric cables connecting between the alternator and the battery are eliminated, or not exposed to the exterior environments that are hostile and hazardous due to, for example, high pressure water jets, standing water, and heavy equipment traffic. The alternator is contained within the air preparation and power unit and remotely located from the air compressor. The alternator is pneumatically connected to the air compressor via an air hose. In certain examples, the air preparation and power unit is arranged closely to the valve unit to shorten a length of electric cables therebetween.

FIG. 1 schematically illustrates a waterblast system 100 in accordance with an example embodiment of the present disclosure. The waterblast system 100 includes a fluid supply device 102, an air supply device 104 including an alternator 114, a waterblast tool 106, and a controller 108. Also shown is an air compressor 174.

The waterblast system 100 can be used in various applications, such as abrasive water jet cutting, hydrodemolition, pipe cleaning, surface preparation and cleaning, tank or vessel cleaning, tube cleaning, and oil field cleaning. For example, the waterblast system 100 is configured for abrasive water jet cutting, which is to slice into metal or other materials using a jet of water at a high velocity and pressure, or by using a mixture of water and an abrasive substance. Hydrodemolition is a process for removing or repairing concrete on various constructions (e.g., roadways and bridges) and elevated parking structures. High-pressure water blasting tools are used to remove concrete while maintaining structural integrity and preserving rebar in the process. For surface preparation and cleaning, the waterblast system 100 is configured to clean a surface using high pressure water blasting. For example, the waterblast system 100 can eliminate rust, old coatings, product residue, or damages concrete prior to re-pouring. The waterblast system 100 can also be used in a variety of industries for process, storage, and transportation of materials, such as reactors, tank trucks, railcars, barges, and ship cargo tanks. In some embodiments, a three-dimensional tool can be dropped into the tank or vessel, and high pressure water is injected through the tool to clean the interior of the entire tank or vessel. For tube cleaning, the waterblast system 100 provides high pressure water to clean unwanted deposits that build up in tubes, heat exchangers, boilers, fin fans, and piping systems. For oil field cleaning, the waterblast system 100 is configured to clean and remove drilling mud and cement from drill pipe, remove paraffin and crude residues on platforms and storage tanks, remove rust and varnish prior to recoating, clean dope and oil from pipe threads for inspection, clean drill pipes that are used for down hole drilling.

The fluid supply device 102 operates to deliver a fluid under pressure to the waterblast tool 106 via a fluid hose 110. In some embodiments, the fluid supplied by the fluid supply device 102 is water. In other embodiments, the fluid supplied by the fluid supply device 102 is a mixture of water and one or more abrasive materials. An example of the fluid supply device 102 is described in more detail with reference to FIG. 2.

The air supply device 104 operates to supply compressed air to the waterblast tool 108 via an air cable 112. An example of the air supply device 104 is described in more detail with reference to FIG. 3.

The alternator 114 is contained in the air supply device 104 and remotely located from the air compressor 174. The alternator 114 receives compressed air from the air compressor 174 via an air hose 180 and converts mechanical energy of the compressed air to electrical energy in the form of alternating current. The electric power generated by the alternator 114 is used to operate various components of the air supply device 104. An example of the alternator 114 is described in more detail with reference to FIG. 7.

The waterblast tool 106 is connected to the fluid supply device 102 via the fluid hose 110 and the air supply device 104 via the air cable 112. The waterblast tool 108 receives pressurized fluid and air from the fluid supply device 102 and the air supply device 104 in controlled manners, and injects either the pressurized fluid or the compressed air, and a mixture of the pressurized fluid and air to a surface or object.

Some examples of the waterblast tool 106 can be an automated tool that can be controlled via a controller or control station that is remotely located from the tool. In some embodiments, the controller 108 is configured to provide an interface for an operator to control the tool 106, as well as the fluid supply device 102 and the air supply device 104. For example, the controller 108 can provide an interface both for adjusting the position, location, length, orientation, angle, operational speed, duration, strength, and/or other operational factors of the tool 106, and for controlling the fluid supply device 102 and the air supply device 104 as described below. In other embodiments, an independent control device is provided for controlling the waterblast tool 106.

In other embodiments, the tool 106 does not need separate controlling. The tool 106 can be controlled by controlling the fluid supply device 102 and the air supply device 104. For example, where the tool 108 is installed in a fixed place and position, the tool 108 can be operated by controlling the fluid supply device 102 and the air supply device 104.

The waterblast tool 106 can be of various types. Examples of the waterblast tool 106 include (1) automated surface cleaning tools with (i) a rail and tractor system, (ii) a tractor, a drive rail, and a rotating waterblasting head, (iii) an air or hydraulic powered swivel unit, and/or (iv) a self-rotary cleaning head; (2) rotary shotgun cleaning tools, (3) concrete demolition systems, (4) automated floor cleaning tools with (i) paint grate cleaning tools or (ii) automated tube lancing systems, (5) exchanger cleaning tools, (6) straight pipe cleaning tools, (7) curved pipe cleaning tools, (8) tank and vessel cleaning tools, (9) furnace and boiler cleaning tools, and (10) rotary swivels, all of which are available by Jetstream of Houston, LLP.

The controller 108 operates to control the fluid supply device 102 and the air supply device 104. In some embodiments, the controller 108 is used to control both of the fluid supply device 102 and the air supply device 104. In other embodiments, the controller 108 is used to further control the tool 106.

In some embodiments, the controller 108 is connected to the fluid supply device 102 and the air supply device 104 in a wired communication network. In other embodiments, the controller 108 is connected to the fluid supply device 102 and the air supply device 104 via a wireless communication network. An example of the wireless controller is disclosed in the U.S. Provisional Patent Application No. 62/248,694 titled WIRELESS CONTROLLED WATERBLASTING SYSTEM, filed on the same day as the present patent application, the entirety of which is hereby incorporated by reference.

The controller 108 provides an interface through which a user interacts with the fluid supply device 102 and the air supply device 104. A user can use the controller 108 to enter input for controlling the fluid supply device 102 and the air supply device 104 and monitor the operational status of the devices 102 and 104.

In some embodiments, the controller 108 is configured as a control station located adjacent the fluid supply device 102 and/or the air supply device 104. For example, an operator can stand by the control system and manipulate the interface (e.g., analog buttons, control sticks, function keys, keypads, and switches) to control the fluid supply device 102 and/or the air supply device 104.

Figure 2:
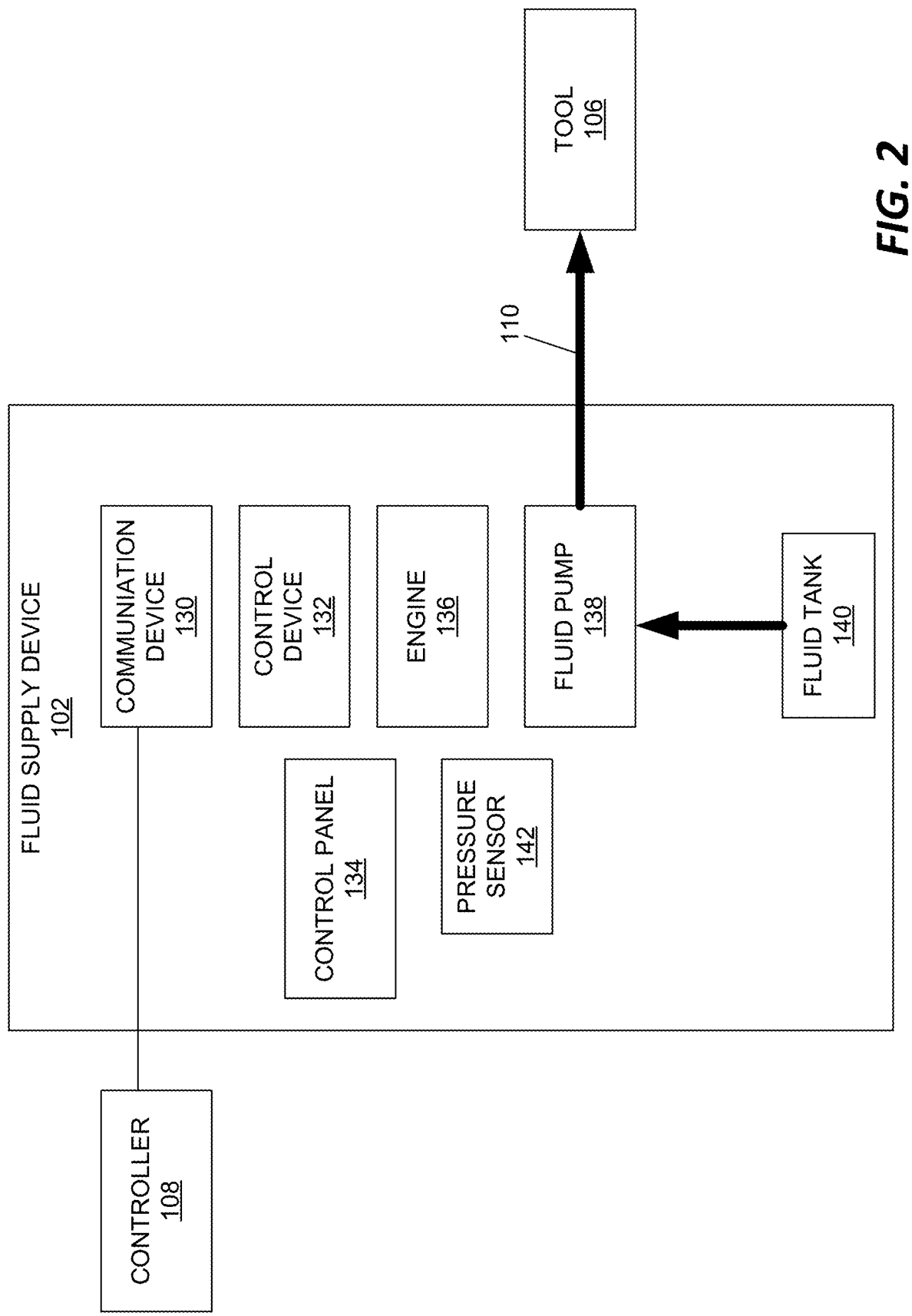
FIG. 2 schematically illustrates a fluid supply device of the waterblast system of FIG. 1.
Figure 3:
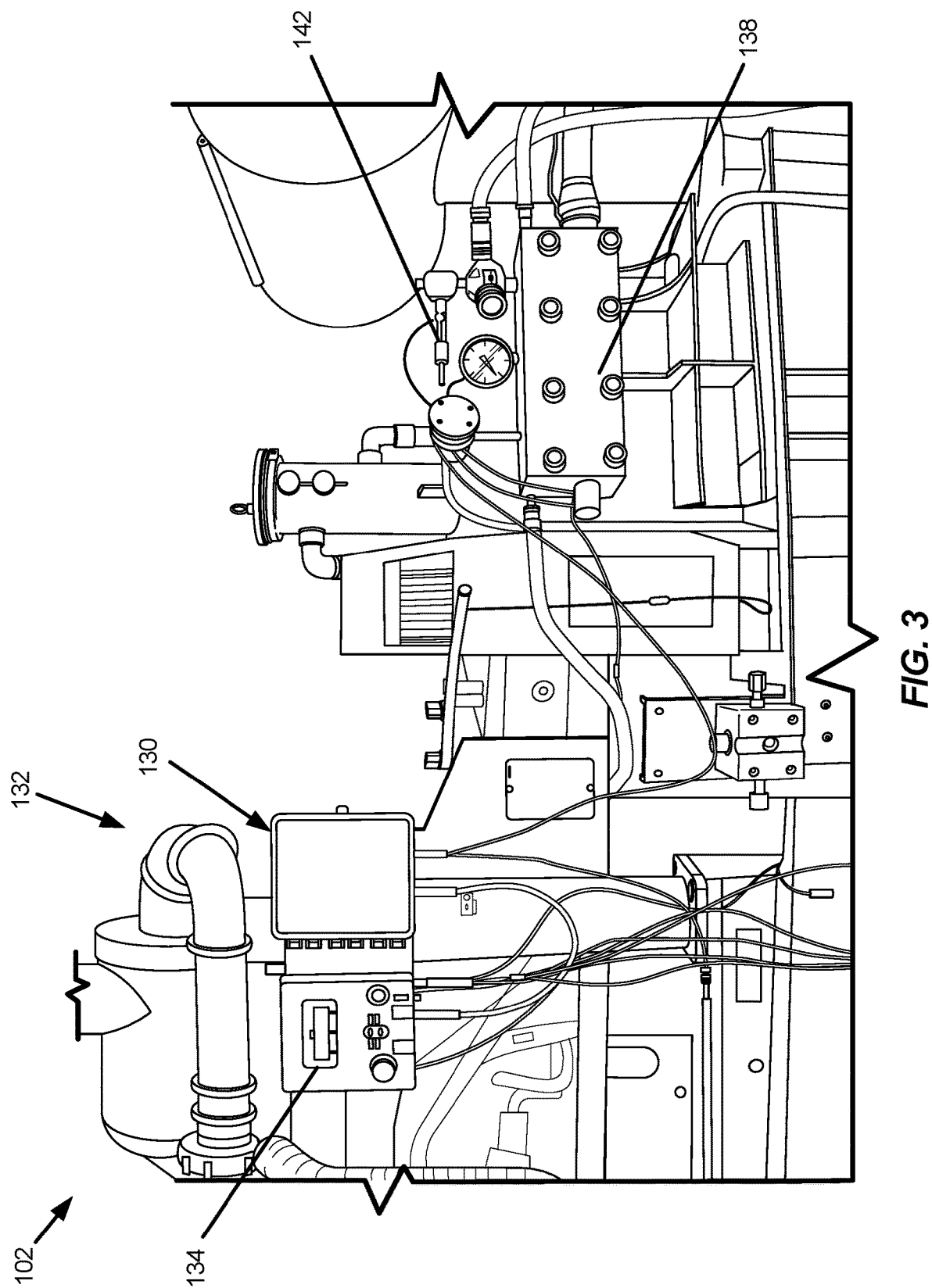
FIG. 3 illustrates an example implementation of the fluid supply device of FIG. 2.

Referring to FIGS. 2 and 3, an example of the fluid supply device 102 is described. FIG. 2 schematically illustrates an example of the fluid supply device 102, and FIG. 3 illustrates an example implementation of the fluid supply device 102. The fluid supply device 102 can include a communication device 130, a control device 132, an engine control panel 134, an engine 136, a fluid pump 138, a fluid tank 140, and a pressure sensor 142.

The communication device 130 operates to communicate with the controller 108. The communication device 130 receives data from the controller 108. Such data can include information about user inputs or selections for controlling the fluid supply device 102. The communication device 130 can transmit data to the controller 108. Such data can include information about the operational status of the fluid supply device 102, and can be displayed on the controller 108.

The control device 132 includes control circuitry designed to control the engine 136 and/or the fluid pump 138. The control device 132 is operated based on a user input through the controller 108. In addition, the control device 132 can also receive a user input through the control panel 134 and control the engine 136 and/or the fluid pump 138 based on the input.

The control panel 134 is included in the fluid supply device 102 and provides an interface for an operator to control the engine 136, the fluid pump 138, and other controllable components of the fluid supply device 102. In some embodiments, the control panel 134 includes a mechanical and/or electrical interface with analog input elements (e.g., analog buttons, control sticks, function keys, keypads, and switches) to receive a user's input or selection for various operations of the fluid supply device 102. For example, the control panel 134 provides switches for increasing and decreasing an engine speed and emergency stop. The controller 108 can include a display device for showing various pieces of information (e.g., operational status or user input) regarding the fluid supply device 102.

The engine 136 operates the fluid pump 138 to deliver pressurized fluid (e.g., water) to the tool 106. The engine 136 can be of any type, such as internal combustion engine and electric motor.

The fluid pump 138 operates to move fluid from the fluid tank 140 to the tool 106. In some embodiments, the fluid pump 138 is configured to pressurize the fluid from the fluid tank 140 and deliver the pressurized fluid to the tool 106.

The fluid tank 140 is configured to store fluid which is to be delivered to the tool 106. In some embodiments, the fluid tank 140 is included in the fluid supply device 108 as a unit. In other embodiments, the fluid tank 140 is placed or arranged separately from the fluid supply device 102 and connected to the fluid supply device 102 (e.g. the fluid pump 138) via a fluid hose.

In other embodiments, the fluid supply device 102 does not include the fluid tank 140, and instead has a direct hose connection to a water source. In this case, the fluid pump 138 receives fluid directly from the water source via a fluid hose.

The pressure sensor 142 operates to monitor fluid pressure at the fluid pump 138. The information about the fluid pressure monitored can be transmitted to the control device 132 and used to adjust controlling the engine 136 and/or the fluid pump 138.

Figure 4:
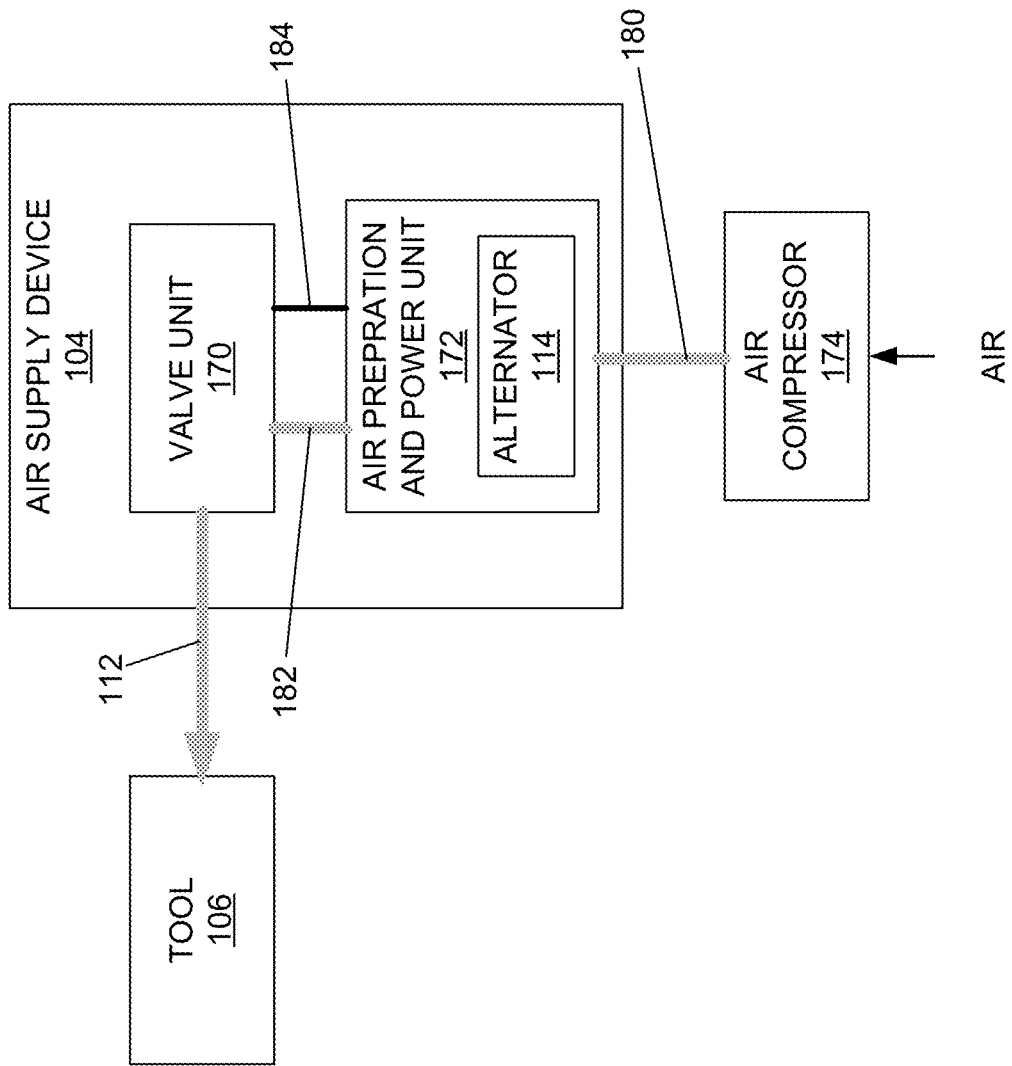
FIG. 4 schematically illustrates an air supply device of the waterblast system of FIG. 1.

FIG. 4 schematically illustrates an example of the air supply device 104. The air supply device 104 includes a valve unit 170 and an air preparation and power unit 172.

The valve unit 170 is configured to control delivery of compressed air to the tool 106. In this example, the valve unit 170 is controlled using the controller 108. In some embodiments, the valve unit 170 is configured as a self-contained unit, which is separately movable from other components (e.g., the air preparation and power unit 172 and the air compressor 174) of the air supply device 104. Therefore, the valve unit 170 is easily transportable, as well as other separately configured components, such as the air preparation and power unit 172. The valve unit 170 can includes a frame, box, or cabinet 400 that can secure the components of the valve unit 170 as described in FIG. 6. An example of the valve unit 170 is described in more detail with reference to FIGS. 5-6.

The air preparation and power unit 172 operates to receive the compressed air from the air compressor 174 and prepare the air to be suitable for the tool 106. The air preparation and power unit 172 is pneumatically connected to the air compressor 174 and the valve unit 170 via air hoses 180 and 182. The air preparation and power unit 172 further operates to provide electric power to components of the air supply device 104. In some embodiments, the air preparation and power unit 172 includes the alternator 114 to generate electric power from the compressed air delivered from the air compressor 174. The air preparation and power unit 172 are electrically connected to the valve unit 170 via a power cable 184, thereby supplying at least some of the generated electric power to the valve unit 170.

In some embodiments, the air preparation and power unit 172 is configured as a self-contained unit, which is separately movable from other components (e.g., the valve unit 170 and the air compressor 174) of the air supply device 104. Therefore, the air preparation and power unit 172 is easily transportable, as well as other separately configured components, such as the valve unit 170 as described above. The air preparation and power unit 172 can includes a frame, box, or cabinet 430 that can secure the components of the air preparation and power unit 172 as described in FIG. 8. The alternator 114 is secured within such a frame, box, or cabinet along with the other components of the air preparation and power unit 172. An example of the air preparation and power unit 172 is described in more detail with reference to FIG. 7.

In the illustrated example, it is primarily illustrated that the valve unit 170 and the air preparation and power unit 172 are separately configured and independently movable, it is also possible to include the valve unit 170 and the air preparation and power unit 172 in a same enclosure, frame, box, or cabinet.

The air compressor 174 operates to take in and compress air. In the illustrated example, the air compressor 174 is not contained in, and located separately from, the air supply device 104. In other embodiments, the air compressor 174 is included in the air supply device 104. In yet other embodiments, the air compressor 174 can be driven by the engine of the fluid supply device 102. In yet other embodiments, the air compressor 174 is included as a component of the fluid supply device 102.

Figure 5:
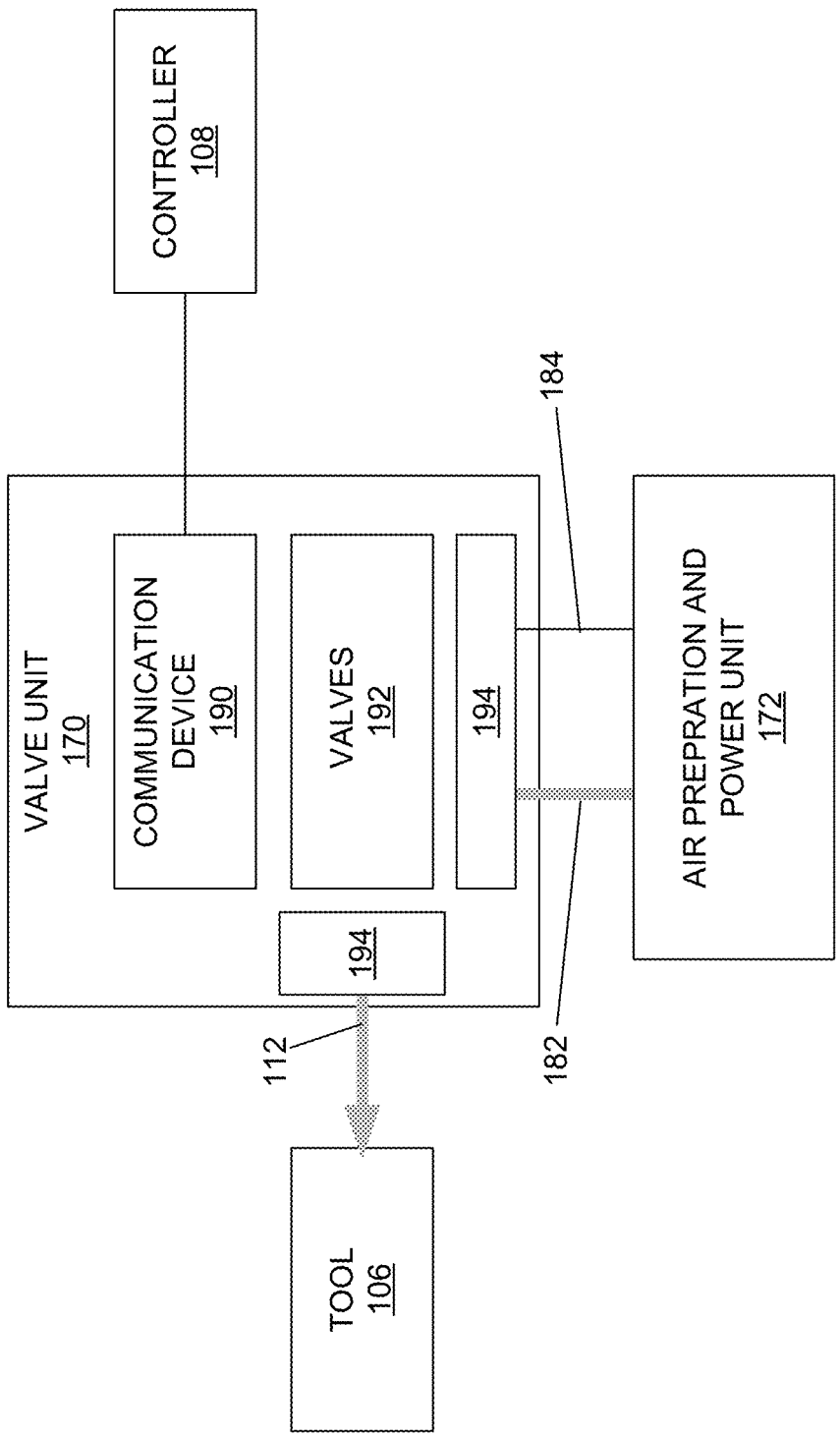
FIG. 5 schematically illustrates a valve unit of the air supply device of FIG. 3.
Figure 6:
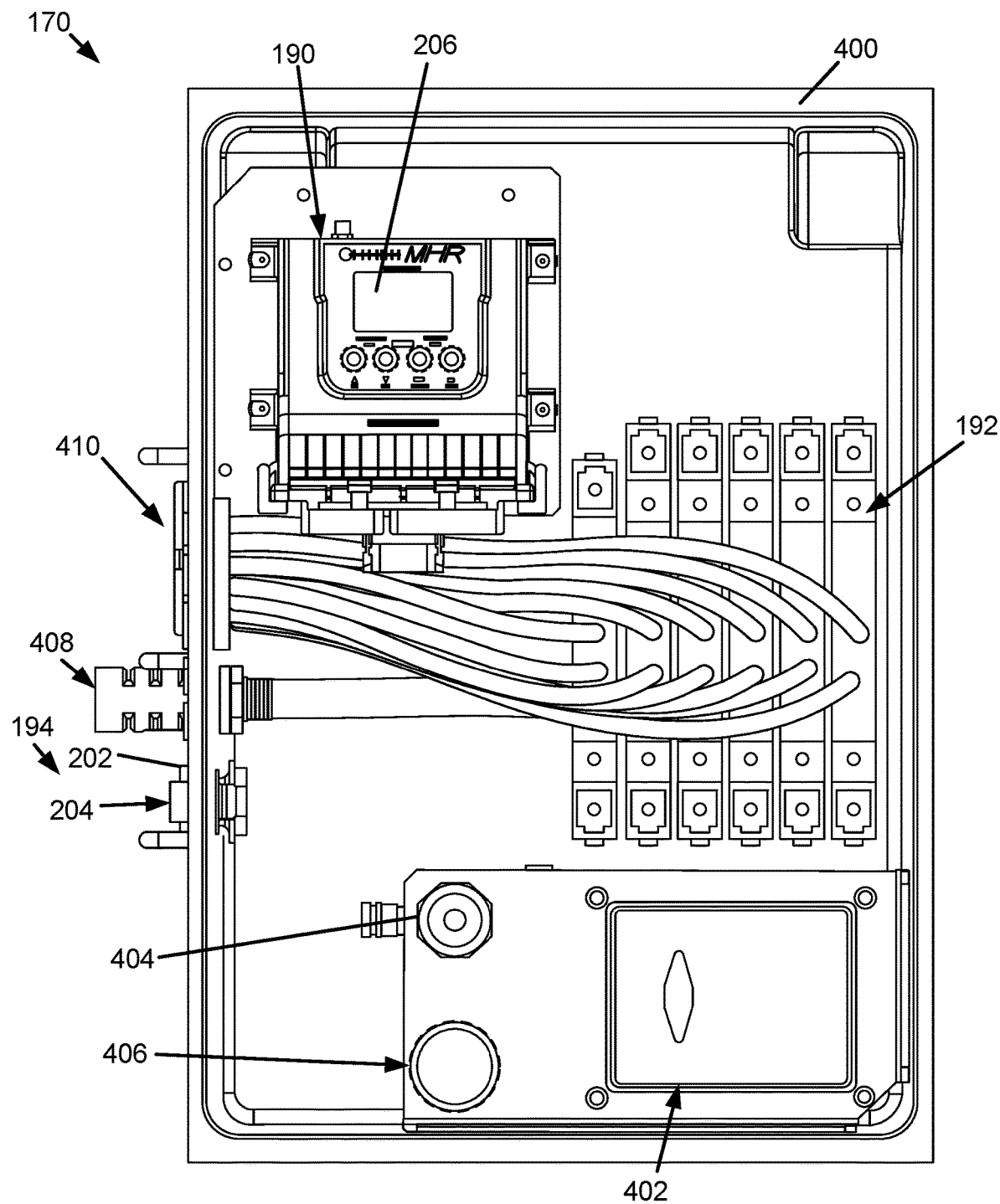
FIG. 6 shows an example implementation of the valve unit of FIG. 5.

Referring to FIGS. 5 and 6, an example of the valve unit 170 is described. In particular, FIG. 5 schematically illustrates an example of the valve unit 170, and FIG. 6 shows an example implementation of the valve unit 170. The valve unit 170 can include a communication device 190, one or more valves 192, and a quick disconnect (QD) couplings 194.

With reference to FIG. 5, the communication device 190 operates to communicate with the controller 108. The communication device 190 receives data from the controller 108. Such data can include information about user inputs or selections for controlling the valve unit 170. The communication device 190 can transmit data to the controller 108. Such data can include information about the operational status of the valve unit 170, and can be displayed on the controller 108. Other embodiments of the communication device 190 include a wireless communication unit 206 configured to establish wireless communication with the controller 108 via, for example, a wireless local area network. An example of the wireless communication unit is disclosed in the U.S. Provisional Patent Application No. 62/248,694 titled WIRELESS CONTROLLED WATERBLASTING SYSTEM, filed on the same day as the present patent application, the entirety of which is hereby incorporated by reference.

The valves 192 are provided to selectively control flow of compressed air into the tool 106. The valves 192 are connected to the tool 106 via the air cable 112. The valves 192 are controlled based on user control inputs or selections which are entered via the controller 108 and received by the communication device 190. In some embodiments, the valves 192 include directional valves. For example, each of the directional valves 192 includes a spool within a cylinder which is mechanically, pneumatically, or electrically actuated based on the user control inputs or selections via the controller 108. The movement of the spool restricts or permits the flow of compressed air, thereby controlling delivery of compressed air to the tool 106. By way of example, the spool of the valve 192 is actuated using one or more solenoids. The position of the spool within the cylinder can be determined based on an amount of current supplied to the solenoids.

The quick disconnect couplings 194 are configured to connect and/or disconnect hydraulic or pneumatic lines quickly and easily without the use of tools. In this example, the quick disconnect couplings 194 are configured to conveniently connect and/or disconnect the air cable 112 for the tool 106. Further, the quick disconnect couplings 194 can be arranged to easily connect and/or disconnect the air cable 182 and the power cable 184 from the air preparation and power unit 172. As shown in FIG. 6, the quick disconnect couplings 194 include an air cable connector 202 and a power cable connector 204. The quick disconnect couplings 194 can further include a multiport air connector 410. Other configurations for fitting the air cable 182 and the power cable 184 are also possible in other embodiments.

With reference to FIG. 6, the valve unit 170 includes a frame or box 400 containing the components of the valve unit 170. In addition to the components of the valve unit 170 as described above, the valve unit 170 includes a speed control valve 402 including a pressure regulator 404 and a pressure gauge 406. The speed control valve 402 can operate to control a pressure of the compressed air flowing from the air compressor 174. The valve unit 170 further includes an air exhaust muffler 408 pneumatically connected to the valves 192. The valve unit 170 also includes a multiport air connector 410 pneumatically connected to the valves 192 within the valve unit 170 and configured to connect the air cable 112 for the tool 106.

Figure 7:
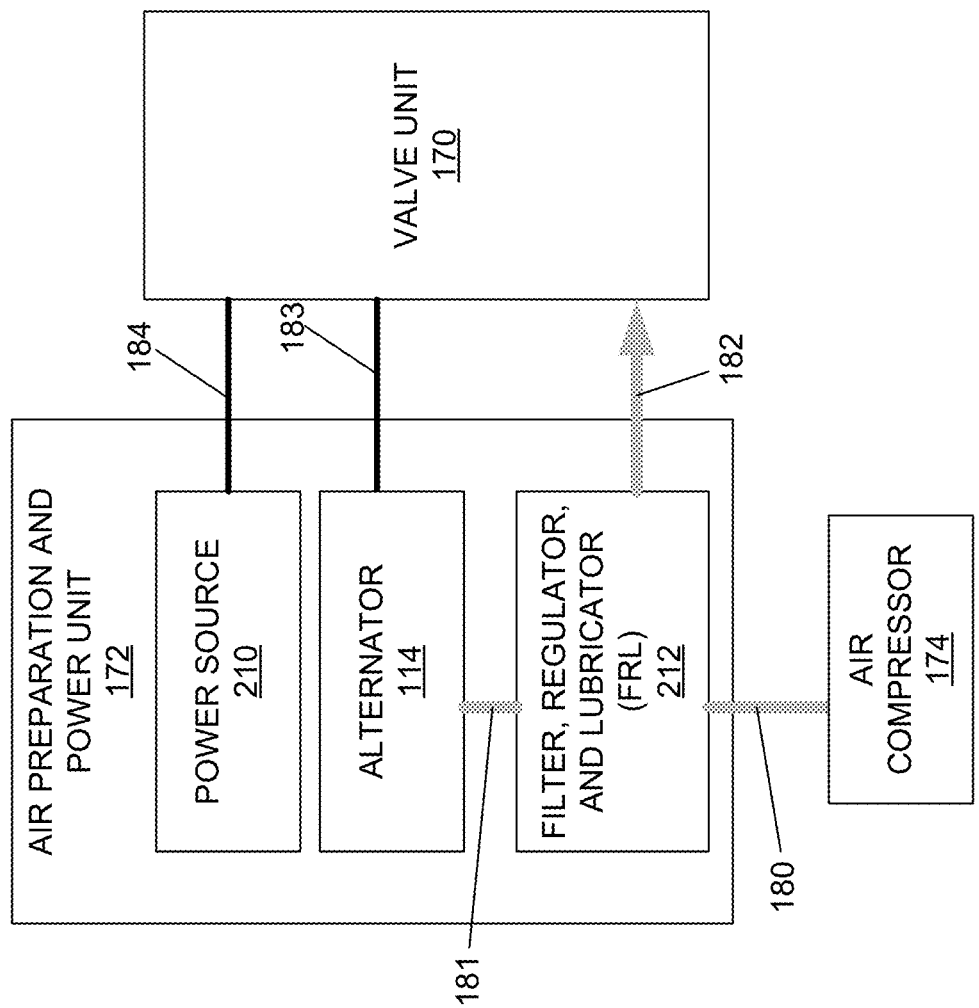
FIG. 7 schematically illustrates an air preparation and power unit of the air supply device of FIG. 3.
Figure 8:
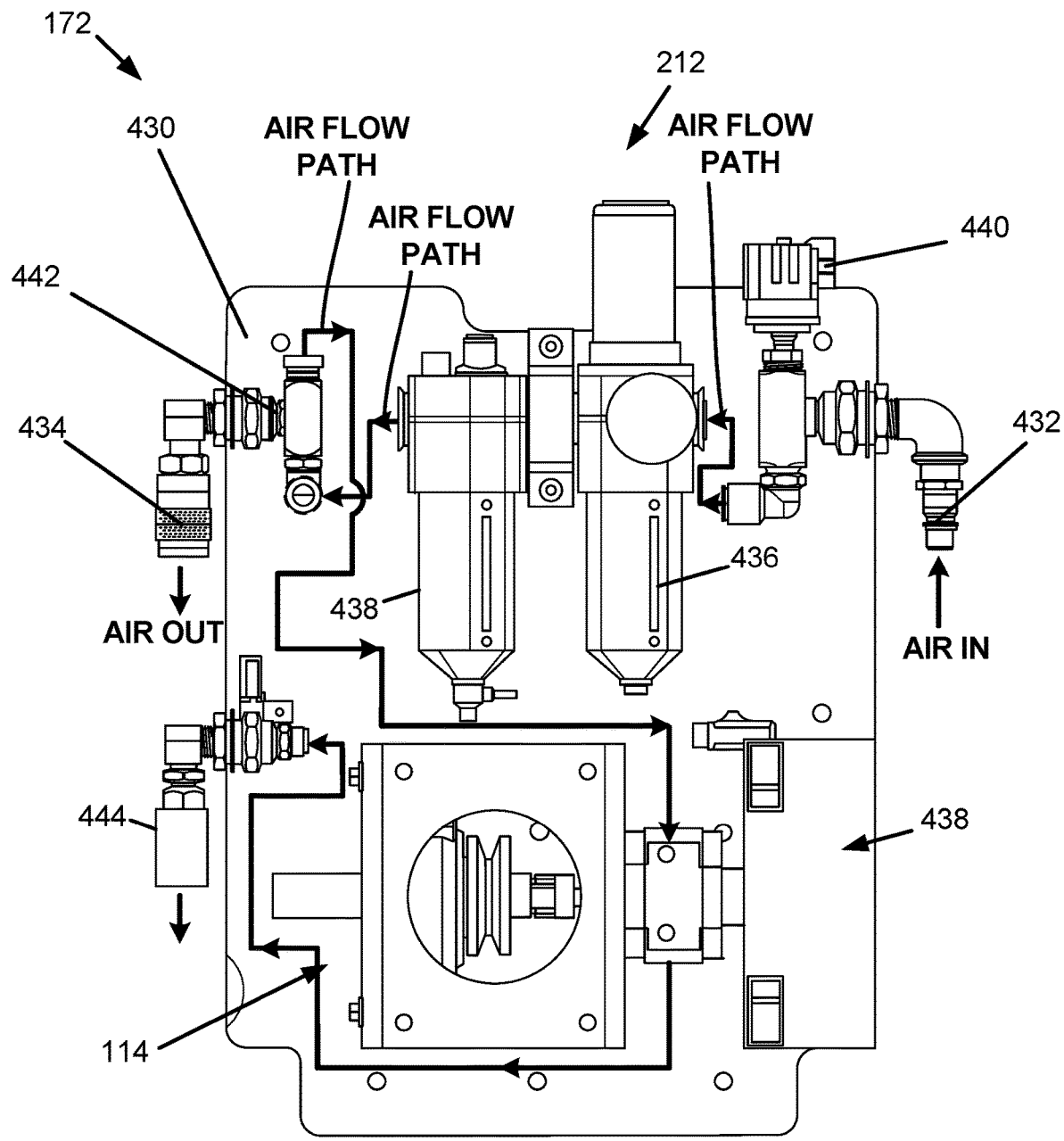
FIG. 8 shows an example implementation of the air preparation and power unit of FIG. 7.

Referring to FIGS. 7 and 8, an example of the air preparation and power unit 172 is described. In particular, FIG. 7 schematically illustrates an example of the air preparation and power unit 172, and FIG. 8 shows an example implementation of the air preparation and power unit 172. The air preparation and power unit 172 includes a power source 210 and a set of filter, regulator, and lubricator (FRL) 212. The air preparation and power unit 172 further includes the alternator 114.

The power source 210 operates to supply electric power to the valve unit 170 via the electrical cable 184 to actuate the components of the valve unit 170. In some embodiments, the power source 210 includes a battery 438 (FIG. 8). In other embodiments, the power source 210 does not include a battery, and the alternator 114 functions as the power source 212.

The alternator 114 is contained in the air preparation and power unit 172 and separate from the air compressor 174. The alternator 114 receives compressed air delivered from the air compressor 174 via the air hose 180 and converts mechanical energy of the compressed air to electrical energy in the form of alternating current. In some embodiments, the alternator 114 is arranged to receive compressed air from the FRL 212 via pneumatic connection 181 (e.g., air hose). In other embodiments, the alternator 114 is arranged to receive compressed air directly from the air compressor 174. In some embodiments, the electric power generated by the alternator 114 is used to charge the battery 438. In addition or alternatively, the electric power from the alternator 114 is directly supplied to the valve unit 170 via an electrical cable 183.

The FRL 212 operates to filter, regulate, and lubricate the compressed air from the air compressor 174. The FRL 212 is used to avoid damage of downstream equipment due to hot, dirty, and wet air flowing from the air compressor 174. For example, the filter of the FRL 212 operates to remove contaminants from the compressed air, preventing damage to equipment and reducing production losses due to contaminant related downtime. The pressure regulator of the FRL 212 operates to reduce and control fluid pressure in the compressed air. In particular, the pressure regulator of the FRL 212 maintains a constant output pressure regardless of variations in the input pressure and downstream flow requirements. The pressure regulator of the FRL 212 contributes to controlling of control pressure to the tool 106. The lubricator of the FRL 212 operates to add controlled quantities of oil into the compressed air to reduce the friction of moving components.

With reference to FIG. 8, the air preparation and power unit 172 includes a frame or box 430 containing the components of the air preparation and power unit 172. In addition to the components of the air preparation and power unit 172 as described above, the air preparation and power unit 172 includes an air inlet port with an air inlet fitting 432 to which the air hose 180 is connected, and an air outlet port with an air outlet fitting 434 to which the air hose 182 is connected. Between the air inlet and outlet fittings 432 and 434 is arranged the FRL 212, which includes a set of filter and regulator 436 and a lubricator 438. A pressure switch 440 is arranged upstream of the FRL 212. A split valve 442 is arranged downstream of the FRL 212 to split the air flow into the air outlet fitting 434 (toward the tool 106) and the alternator 114. A muffler 444 can be provided for the alternator 114. In some embodiments, the alternator 114 is arranged adjacent the battery 438 and is electrically connected to the battery 438 without an exposed electrical cable therebetween within the box 430 of the air preparation and power unit 172.

As illustrated in FIGS. 7 and 8, the alternator 114 is arranged adjacent the battery 438 within the air preparation and power unit 172, and electrically connected to the battery 438 within the air preparation and power unit 172, Therefore, any electrical connection between the alternator 114 and the battery 210 is not exposed to the working environments, which may cause damage to the electrical connection. Further, the electrical connection between the valve unit 170 and the air preparation and power unit 172 is not exposed to the harsh working environments. As described herein, the air preparation and power unit 172 is arranged closely to the valve unit 170 to shorten a length of the electrical cables 182 and 183 between the valve 170 and the air preparation and power unit 172.

Figure 9:
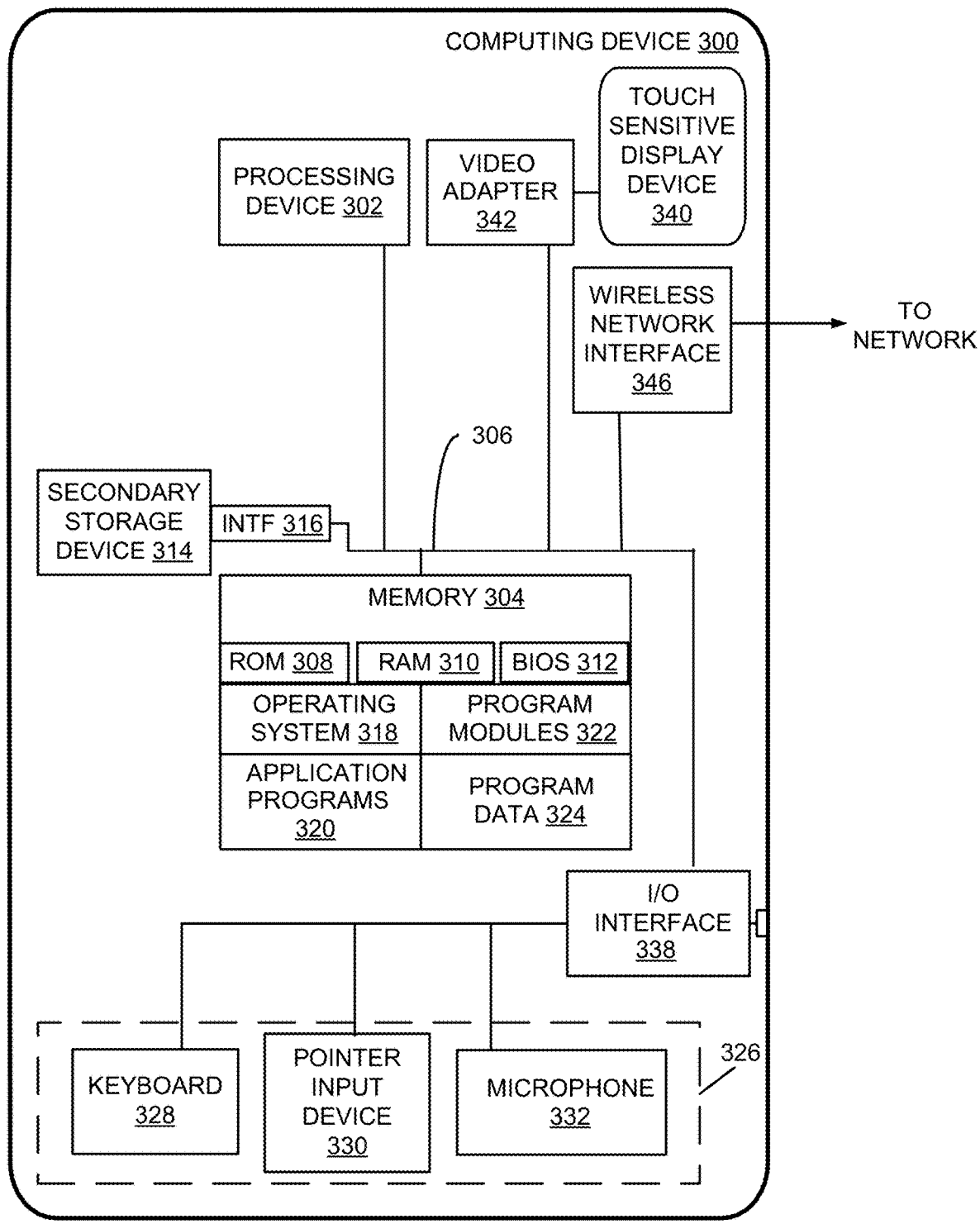
FIG. 9 illustrates an exemplary architecture of a computing device that can be used to implement aspects of the present disclosure.

FIG. 9 illustrates an exemplary architecture of a computing device that can be used to implement aspects of the present disclosure, including the controller 108, and will be referred to herein as the computing device 300. The computing device 300 is used to execute the operating system, application programs, and software modules (including the software engines) described herein.

The computing device 300 includes, in some embodiments, at least one processing device 302, such as a central processing unit (CPU). A variety of processing devices are available from a variety of manufacturers, for example, Intel or Advanced Micro Devices. In this example, the computing device 300 also includes a system memory 304, and a system bus 306 that couples various system components including the system memory 304 to the processing device 302. The system bus 306 is one of any number of types of bus structures including a memory bus, or memory controller; a peripheral bus; and a local bus using any of a variety of bus architectures.

Examples of computing devices suitable for the computing device 300 include a desktop computer, a laptop computer, a tablet computer, a mobile device (such as a smart phone, an iPod® mobile digital device, or other mobile devices), or other devices configured to process digital instructions.

The system memory 304 includes read only memory 308 and random access memory 310. A basic input/output system 312 containing the basic routines that act to transfer information within computing device 300, such as during start up, is typically stored in the read only memory 308.

The computing device 300 also includes a secondary storage device 314 in some embodiments, such as a hard disk drive, for storing digital data. The secondary storage device 314 is connected to the system bus 306 by a secondary storage interface 316. The secondary storage devices and their associated computer readable media provide nonvolatile storage of computer readable instructions (including application programs and program modules), data structures, and other data for the computing device 300.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 314 or memory 304, including an operating system 318, one or more application programs 320, other program modules 322, and program data 324.

In some embodiments, computing device 300 includes input devices to enable a user to provide inputs to the computing device 300. Examples of input devices 326 include a keyboard 328, pointer input device 330, microphone 332, and touch sensitive display 340. Other embodiments include other input devices 326. The input devices are often connected to the processing device 302 through an input/output interface 338 that is coupled to the system bus 306. These input devices 326 can be connected by any number of input/output interfaces, such as a parallel port, serial port, game port, or a universal serial bus. Wireless communication between input devices and interface 338 is possible as well, and includes infrared, BLUETOOTH® wireless technology, 802.11a/b/g/n, cellular, or other radio frequency communication systems in some possible embodiments.

In this example embodiment, a touch sensitive display device 340 is also connected to the system bus 306 via an interface, such as a video adapter 342. The touch sensitive display device 340 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 340, the computing device 300 can include various other peripheral devices (not shown), such as speakers or a printer.

When used in a local area networking environment or a wide area networking environment (such as the Internet), the computing device 300 is typically connected to the network through a network interface, such as a wireless network interface 346. Other possible embodiments use other communication devices. For example, some embodiments of the computing device 300 include an Ethernet network interface, or a modem for communicating across the network.

The computing device 300 typically includes at least some form of computer-readable media. Computer readable media includes any available media that can be accessed by the computing device 300. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 300.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A waterblast system comprising:
   a waterblast tool;
   a fluid supply device coupled in fluid communication to the waterblast tool via a fluid hose, wherein the fluid supply device comprises a fluid pump configured to provide a pressurized fluid to the waterblast tool;
   an air compressor configured to generate a compressed air; and
   an air supply device comprising:
      a valve unit pneumatically connected to the waterblast tool via an air cable and configured to control delivery of the compressed air to the waterblast tool; and
      an air preparation and power unit comprising an alternator and a split valve, the air preparation and power unit pneumatically connected to the air compressor via a first air hose, wherein the air preparation and power unit is electrically connected to the valve unit via at least one electrical cable and is pneumatically connected to the valve unit via a second air hose, and wherein the air preparation and power unit is upstream from the valve unit,
   wherein when the air compressor generates the compressed air, the compressed air is channeled towards the air preparation and power unit via the first air hose and is split at the split valve into a first flow towards the waterblast tool and through the valve unit, the air cable, and the second air hose, and a discrete second flow towards the alternator so as to generate electric power directly from at least a portion of the compressed air, wherein the electric power generated by the alternator at least partially powers the valve unit via the at least one electrical cable.

2. The waterblast system of claim 1, wherein the air preparation and power unit is not electrically connected to the air compressor.

3. The waterblast system of claim 1, wherein the air preparation and power unit includes:
   a filter, regulator, and lubricator unit configured to filter, regulate, and lubricate the compressed air upstream of the valve unit; and
   a power source configured to provide electric power to the valve unit.

4. The waterblast system of claim 3, wherein the air preparation and power unit and the valve unit are separately configured and movable.

5. The waterblast system of claim 1, wherein the fluid supply device further includes:
   an engine adapted to operate the fluid pump; and
   a controller that controls the engine based on a user input.

6. The waterblast system of claim 5, wherein the controller includes an engine control panel providing an interface for a user to control the engine.

7. The waterblast system of claim 5, wherein the fluid supply device further includes a pressure sensor configured to detect a pressure at the fluid pump, and the controller receives data including the pressure and uses the data for controlling the engine.

8. The waterblast system of claim 1, further comprising:
   a controller connected to the fluid supply device and the air supply device and configured to receive a user input for controlling the fluid supply device and the air supply device.

9. The waterblast system of claim 8, wherein
   the valve unit includes a communication device configured to communicate with the controller and receive at least part of the user input from the controller; and
   the fluid supply device includes a communication device configured to communicate with the controller and receive at least part of the user input from the controller.

* * * * *